(12) United States Patent
Ueno et al.

(10) Patent No.: US 7,723,248 B2
(45) Date of Patent: May 25, 2010

(54) CERAMIC COMPOSITE MATERIAL AND METHOD FOR PRODUCING SAME

(75) Inventors: Tomoyuki Ueno, Itami (JP); Masashi Yoshimura, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/595,577

(22) PCT Filed: Oct. 22, 2004

(86) PCT No.: PCT/JP2004/016077

§ 371 (c)(1),
(2), (4) Date: Apr. 28, 2006

(87) PCT Pub. No.: WO2005/039733

PCT Pub. Date: Jun. 5, 2005

(65) Prior Publication Data

US 2007/0129233 A1 Jun. 7, 2007

(30) Foreign Application Priority Data

Oct. 29, 2003 (JP) ............................. 2003-368714
Oct. 29, 2003 (JP) ............................. 2003-368715
Sep. 29, 2004 (JP) ............................. 2004-282952

(51) Int. Cl.
*C04B 35/52* (2006.01)
*C04B 35/00* (2006.01)

(52) U.S. Cl. ..................... 501/99; 501/97.4; 501/154

(58) Field of Classification Search ............. 501/127, 501/95.2, 97.4, 99, 154
See application file for complete search history.

(56) References Cited

U.S. PATENT DOCUMENTS

| | | | | |
|---|---|---|---|---|
| 4,157,897 A * | 6/1979 | Keat | ............... | 51/295 |
| 5,690,706 A * | 11/1997 | Sigalas et al. | ............... | 51/307 |
| 5,723,177 A * | 3/1998 | Brandrup-Wognsen et al. | .. | 427/215 |
| 5,728,637 A * | 3/1998 | Mishra et al. | ............... | 501/127 |
| 6,420,293 B1 * | 7/2002 | Chang et al. | ............... | 501/95.2 |
| 2004/0029706 A1 * | 2/2004 | Barrera et al. | ............... | 501/99 |

FOREIGN PATENT DOCUMENTS

| JP | S52-064267 | 5/1977 |
|---|---|---|
| JP | S60-060965 A | 4/1985 |
| JP | S60-100646 A | 6/1985 |
| JP | H05-301773 A | 11/1993 |
| JP | H09-087029 A | 3/1997 |
| JP | H10-231174 A | 9/1998 |
| JP | 2003-034580 A | 2/2003 |
| JP | 2003-034584 A | 2/2003 |
| JP | 2004-067432 A | 3/2004 |
| JP | 2004-339048 A | 12/2004 |

OTHER PUBLICATIONS

Peigney et al, Carbon nanotubes in novel ceramic matrix nanocomposites, Ceramics International, vol. 26, Issue 6 Jul. 17, 2000, p. 677-683.*
Flahaut et al. Carbon nanotube-metal-oxide nanocomposites: microstructure, electrical conductivity and mechanical properties, Acta Materialia, vol. 48, Issue 14 Sep. 1, 2000.*
Mishra et al, Nanocrystalline Alumina by High Pressure Sintering, Mat. Sci. Forum vol. 225-227, p. 617 (1996).*
Henryk et al. Influence of oxygen content in a sintering atmosphere on the phase composition and mechanical properties of Al2O3-10 wt% ZrO2 ceramics, Journal of Materials Science Letters 7 (1988) 778-780.*
Chen et al, Particle-size effect on the compressibility of nanocrystalline alumina, Physical review B 66, 144101, pp. 1-4 (2002)).*
Gromnitskaya. Mechanical behavior and microstructure of nanodiamond-based composite materials. Journal of materials science letters 21, 2002, 1699-1702.*
Kim. Characterization of hydrous ruthenium oxide/carbon nanocomposite supercapacitors prepared by a colloidal method. Journal of Power Sources. vol. 104, issue 1. Jan. 15, 2002. pp. 52-61.*
Ioroi. platinum and molybdenum oxide deposited carbon electrocatalyst for oxidation of hydrogen containing carbon monoxide. Electrochemistry Communications 4 (2002) pp. 442-446.*

* cited by examiner

*Primary Examiner*—C. Melissa Koslow
*Assistant Examiner*—Matthew E Hoban
(74) *Attorney, Agent, or Firm*—James W. Judge

(57) ABSTRACT

Highly wear-resistant, low-friction ceramic composites suited for machining-tool, sliding-component, and mold-die materials are made available. The ceramic composites characterized are constituted from a phase having carbon of 3 μm or less, preferably 30 nm or less, average crystal-grain size as the principal component, and a ceramic phase (with the proviso that carbon is excluded). The ceramic phase is at least one selected from the group made up of nitrides, carbides, oxides, composite nitrides, composite carbides, composite oxides, carbonitrides, oxynitrides, oxycarbonitrides, and oxycarbides of Al, Si, Ti, Zr, Hf, V, Nb, Ta, Cr, Mo and W. The ceramic composites are produced by sintering the source-material powders at a sintering temperature of 800 to 1500° C. and a sintering pressure of 200 MPa or greater.

4 Claims, No Drawings

CERAMIC COMPOSITE MATERIAL AND METHOD FOR PRODUCING SAME

BACKGROUND OF THE INVENTION

1. Technical Field

The present invention relates to ceramic composites having superior mechanical characteristics in a room-temperature to medium/high-temperature range, employed as high wear resistance/low-friction ceramic materials in applications including diverse structural components, machining tools, sliding components, and mold-die materials; the invention also relates to methods of manufacturing such composites.

2. Description of the Related Art

Materials in which particles of a solid lubricant such as carbon have been dispersed into a ceramic matrix such as silicon nitride to improve the frictional coefficient and relative wear rate of the materials have been known to date.

For example, materials having outstanding frictional characteristics and wear-resistant properties, derived from composites of silicon nitride and titanium nitride together with 0.5 to 20 wt. % graphite and carbon, are reported in Japanese Unexamined Pat. App. Pub. No. 2003-34580. Nevertheless, sinter test samples of powders prepared under the conditions set forth in Pat. App. Pub. No. 2003-34580 were characterized using a scanning electron microscope at a magnification of 2000, whereupon numerous pores of 20 μm or greater diameter were observed, with the open porosity being a large 3% or more, which evidenced that it would be impossible to use the material for molds.

Meanwhile, a super-tough material in which 0.5 to 6 wt. % C, Cr, Mo, W, Al, Ti and Ni are incorporated as an oxidation-resistant alloy into alumina and zirconia is reported in Japanese Unexamined Pat. App. Pub. No. S60-100646; nevertheless, with the carbon content being a slight 0.1 to 0.2%, the material lacks the lubricity for molds.

In addition, a material that excels in resistance to wear, in which 2 to 50 wt. % carbon of 5 μm or greater grain size has been added to silicon carbide, is reported in Japanese Unexamined Pat. App. Pub. No. H09-87029, while a material in which 3 to 30 wt. % graphite of 3 to 6 μm average crystal-grain size has been dispersed within a titanium carbide matrix is reported in Japanese Unexamined Pat. App. Pub. No. H05-301773. Nevertheless, with the average crystal-grain size of the carbon being a large 3 μm or greater, in processing the material into a desired form the surface roughness is affected by the grain size, which is prohibitive of producing on the material reflective surfaces of 10 nm or less roughness average.

Presented in Japanese Unexamined Pat. App. Pub. No. H10-231174, furthermore, is a material in which graphite and boron nitride are dispersed into a non-oxide ceramic, between boundary layers of which an iron compound (such as an iron oxide or silicide) is interposed. Owing to the inclusion of iron, however, this material suffers from problems such as deterioration due to oxidation, and compromised stability at high temperatures, making it unfit for use as a mold-die substance.

BRIEF SUMMARY OF THE INVENTION

An object of the present invention, in view of the circumstances discussed above, is to make available ceramic composites that, in addition to having superior mechanical characteristics in a room-temperature to medium/high-temperature range, have enhanced mold-releasability for glass, resin, and ceramic, among other materials; the object at the same time is to afford a method of manufacturing such composites.

The present inventors brought the present invention to completion discovering, as the result of cumulative studies, that the problems detailed above can be resolved by having the average crystal-grain size in ceramic composites that contain a phase having carbon as the principal component be 3 μm or less, preferably 30 nm or less.

Specifically, the present invention has the following configurational features.

(1) A ceramic composite characterized in being composed of a phase having carbon of 3 μm or less, preferably 30 nm or less, average crystal-grain size as the principal component, and a ceramic phase (with the proviso that carbon is excluded).

(2) A ceramic composite as noted at (1) above, characterized in that the content of the phase having carbon as the principal component is 2 to 98 wt. %.

(3) A ceramic composite as noted at (1) and (2) above, characterized in that the open porosity in the composite superficially after being polished is 1% or less.

(4) A ceramic composite as noted at (1) and (2) above, characterized in that the Vickers hardness of the composite in sintered form is 10 GPa or greater.

(5) A ceramic composite as noted at (1) through (4) above, characterized in that the ceramic phase is constituted from at least one selected from the group made up of nitrides, carbides, oxides, composite nitrides, composite carbides, composite oxides, carbonitrides, oxynitrides, oxycarbonitrides, and oxycarbides of Al, Si, Ti, Zr, Hf, V, Nb, Ta, Cr, Mo and W.

(6) A method of manufacturing a ceramic composite composed of a phase having carbon of 3 μm or less, preferably 30 nm or less, average crystal-grain size as the principal component, and a ceramic phase, characterized in that a powder blend of a ceramic powder (with the proviso that carbon is excluded) in which the average crystal-grain size is 3 μm or less, preferably 30 nm or less, and a carbon powder is molded, and the obtained molded form is sintered within a non-oxidizing atmosphere at a sintering temperature of 800 to 1500° C. and a sintering pressure of 200 MPa or more.

(7) A method of manufacturing the ceramic composite, noted at (5) above, composed of a phase having carbon of 3 μm or less, preferably 30 nm or less, average crystal-grain size as the principal component, and a ceramic phase, characterized in that the ceramic powder is at least one selected from the group made up of nitrides, carbides, oxides, composite nitrides, composite carbides, composite oxides, carbonitrides, oxynitrides, oxycarbonitrides, and oxycarbides of Al, Si, Ti, Zr, Hf, V, Nb, Ta, Cr, Mo and W.

(8) A method of manufacturing the ceramic composite, noted at (6) and (7) above, composed of a phase having carbon of 3 μm or less, preferably 30 nm or less, average crystal-grain size as the principal component, and a ceramic phase, characterized in that the powder mixture further includes at least one metal selected from Al, Si, Ti, Zr, Hf, V, Nb, Ta, Cr, Mo and W.

DETAILED DESCRIPTION OF THE INVENTION

The present invention is ceramic composites characterized in being composed of a phase having carbon of 3 μm or less, preferably 30 nm or less, average crystal-grain size as the principal component, and a ceramic phase. This phase that within the ceramic composite has carbon as the chief component exhibits superior mold releasability for glass, resins, and ceramics, among other materials. Should the average crystal-grain size of the ceramic-composite phase exceed 3 μm, in processing the composite material into desired form, the roughness average would be of such magnitude that a mirror-like finish would be unattainable.

Furthermore, "carbon" in the present invention should be matter whose constituent substance consists of carbon, and thus can be appropriately selected from materials such as graphite (C), graphitic carbon (GC), diamond, carbon nanotubes (CNT), fullerene ($C_{60}$), and carbon nanofibers (CNF), for example. The amount of carbon contained in the composite advisably is 2 to 98 wt. %; content less than this is undesirable because then the mold-releasability properties of the material are compromised, and content greater than this is likewise undesirable because then the material does not sinter. It is preferable that carbon content be 30 to 80 wt. %; that it be 40 to 60 wt. % is especially preferable. The carbon content being in this range of values improves all the more the mold-releasability properties of the composite with respect to materials such as glass, resin, and ceramic.

The ceramic phase in a ceramic composite of the present invention advisably is formed from at least one selected from the group made up of nitrides, carbides, and oxides of Al, Si, Ti, Zr, Hf, V, Nb, Ta, Cr, Mo and W. Moreover, the ceramic phase may be a composite nitride, composite carbide, or a composite oxide of the metals just mentioned, or may be a carbonitride, oxynitride, oxycarbonitride, or oxycarbide of the metals just enumerated. Advantageously, one or more materials from these classes of ceramic is appropriately selected for the ceramic phase according to the substance that dies formed from the composite will mold, with the content of the ceramic-phase material being 2 to 98 wt. %. Also, a publicly known sintering additive may be utilized as needed in order to improve the sinterability of the composite, but making the additive amount of an oxide-based sintering additive large is unadvisable because the additive reacts intensely with the carbon, which is prohibitive of manufacturing an ultrafine material and compromises the material's mechanical characteristics.

Ceramic composites of the present invention are gotten by molding a powder mixture of at least one kind of ceramic powder—in which the average crystal-grain size is 3 μm or less, preferably 30 nm or less—being a nitride, carbide, or oxide of Al, Si, Ti, Zr, Hf, V, Nb, Ta, Cr, Mo or W, and a carbon powder, and sintering the obtained molded compact within a non-oxidizing atmosphere at a sintering temperature of 800 to 1500° C. and a sintering pressure of 200 MPa or more. A vacuum atmosphere or an atmosphere of an inert gas such as $H_2$, $N_2$ or Ar can be chosen for the non-oxidizing atmosphere, with a vacuum atmosphere being preferred. Also, the foregoing powder mixture may further include at least one metal selected from Al, Si, Ti, Zr, Hf, V, Nb, Ta, Cr, Mo and W. These metals react with the carbon within the powder mixture to form carbides, or, if the non-oxidizing atmosphere is $N_2$, react with the $N_2$ to form nitrides. Some of the metals, moreover, can form carbides or nitrides, etc., by mechanochemical reaction within the mixture.

The sintering reaction will not proceed if the sintering temperature is less than 800° C., which is prohibitive of yielding ceramic composite materials. By the same token, the sintering will proceed too far if the temperature exceeds 1500° C., coarsening the grain size and compromising the mechanical characteristics of the material. A sintering temperature of 1000 to 1400° C. is particularly suitable.

Furthermore, the sintering reaction will not proceed if the sintering pressure is less than 200 MPa, making it impossible to obtain ceramic composite materials. An optimal pressure is 500 MPa or higher.

Next embodiment examples will be given to explain the present invention in detail. It should be noted that in the following, wt. % indicates internal proportion.

The measurement methods used in the embodiments are as follows.

(1) Measurement of Powder Average Grain Size

A transmission electron microscope (TEM: an H-9000 UHRIII mfd. by Hitachi) was employed.

Within an arbitrary area in the image obtained with the TEM, 100 grains of the powder were picked out at random, the size of the grains measured, and the average of the sizes was taken as the average powder grain size.

(2) Measurement of Average Crystal-Grain Size

The transmission electron microscope (TEM: an H-9000 UHRIII mfd. by Hitachi) was employed.

In an arbitrary location in the image obtained with the TEM, a straight line was drawn through a 50-grain extent, and the grain size was found by dividing the length of the line by the number of grains. This operation was carried out in 5 arbitrary locations, and the average was taken as the average crystal-grain size.

(3) Measurement of Open Porosity

A mercury porosimeter (a 9420 mfd. by Shimadzu Seisakusho) was employed.

Mercury is intruded into a sample under pressure, and from the volume of mercury intruded, the pore volume and pore size are calculated.

(4) Measurement of Bending Strength

An all-purpose materials tester (a 5585 mfd. by Instron) was employed.

Data from a three-point bending test was calculated according to standard JIS R 1601.

Embodiment 1

Within a nitrogen atmosphere at 0.1 MPa, mixing of a powder in which 2.5 wt. % $Y_2O_3$ powder as a sintering additive and 1 wt. % $Al_2O_3$ powder were added to a commercial $Si_3N_4$ powder of 0.5 μm average grain size—and further in which 20 wt. % of a metallic Zr powder of 1 μm average grain size and 40 wt. % graphite powder of 5 μm average grain size had been added—was carried out by a ball milling method using $Si_3N_4$ balls, at an acceleration of 10 G.

Qualitative analysis of the obtained composite powder was carried out by X-ray diffraction (XRD), wherein $Si_3N_4$, ZrN, ZrCN, ZrC, and C peaks could be confirmed. Moreover, observation of the composite powder under the transmission electron microscope indicated that the average grain size was 3 μm or less.

Next, ceramic composites utilizing composite powder obtained as set forth above were produced by sintering the powder within a vacuum atmosphere under the conditions entered in Table I. Temperature measurement in producing the composites was by gauging the surface temperature of the molding dies with an infrared optical pyrometer.

TABLE I

| Adopted temp. & press. conditions during sintering | |
|---|---|
| Sintering temp. | Sintering press. |
| 800° C. | 200 MPa |
| 1150° C. | 500 MPa |

TABLE I-continued

| Adopted temp. & press. conditions during sintering | |
|---|---|
| Sintering temp. | Sintering press. |
| 1500° C. | 1000 MPa |
| 1700° C.* | 5000 MPa |

*Comparative example

After grinding and lapping operations on the obtained ceramic composites were implemented, measurement of the average crystal-grain size in 10 arbitrary locations on each ceramic composite was carried out using the transmission electron microscope. In turn, measurement of the open porosity of each was made using the mercury porosimeter. Then Vickers hardness of obtained composites' was measured using a Vickers hardness tester. The results of these measurements are set forth in Table II.

TABLE III

| Test No. | Amt. added graphite within sintering powder (wt. %) |
|---|---|
| 2-1* | 1 |
| 2-2 | 2 |
| 2-3 | 20 |
| 2-4 | 40 |
| 2-5 | 70 |
| 2-6 | 98 |
| 2-7* | 99 |

*Comparative examples

Qualitative analysis of the obtained composite powders was carried out by XRD, wherein $Si_3N_4$, ZrN, ZrCN, ZrC, and C peaks could be confirmed. Moreover, observation of

TABLE II

| | | Sintering pressure (MPa) | | | | | | | | | | | |
|---|---|---|---|---|---|---|---|---|---|---|---|---|---|
| | | 200 | | | 500 | | | 1000 | | | 5000 | | |
| | | Avg. grain size | Open porosity | Vickers hardness | Avg. grain size | Open porosity | Vickers hardness | Avg. grain size | Open Porosity | Vickers hardness | Avg. grain size | Open porosity | Vickers hardness |
| Sintering Temperature (° C.) | 800 | 2.1 μm | 0.7% | 10 GPa | 1.8 μm | 0.6% | 10 GPa | 1.4 μm | 0.4% | 12 GPa | 1.0 μm | 0.3% | 12 GPa |
| | 1150 | 2.4 μm | 0.5% | 10 GPa | 2.1 μm | 0.4% | 11 GPa | 1.7 μm | 0.2% | 12 GPa | 1.2 μm | 0.2% | 13 GPa |
| | 1500 | 2.8 μm | 0.4% | 10 GPa | 2.4 μm | 0.2% | 11 GPa | 2.0 μm | 0.1% | 12 GPa | 1.4 μm | 0.1% | 13 GPa |
| | 1700* | 8.5 μm | 3.2% | 8 GPa | 6.9 μm | 2.7% | 10 GPa | 5.7 μm | 2.1% | 11 GPa | 5.5 μm | 1.9% | 12 GPa |

*Comparative example

The results in Table II evidenced that the average crystal-grain size of ceramic composites produced utilizing 800 to 1500° C. sintering-temperature and 200 to 5000 MPa sintering-pressure conditions was 3 μm or less. When the sintering temperature was 1700° C., grain growth advanced pronouncedly, such that the average crystal-grain size became larger than 3 μm, which meant that the surface roughness of the lap-polished areas on the ceramic composite surfaces was unable to sustain the desired precision.

From the results in Table II, it was evident that the open porosity of sintered forms in which the foregoing sintering conditions were utilized was, at less than 1%, quite favorable. When the open porosity was greater than 1%, if the ceramic composite was used as a glass-molding die for example, the glass entered into the pore regions, giving rise to problems with the mold releasability and with burrs occurring on the transfer surfaces, among other difficulties.

Embodiment 2

Within a nitrogen atmosphere at 0.1 MPa, mixing of powders in which 2.5 wt. % $Y_2O_3$ powder as a sintering additive and 1 wt. % $Al_2O_3$ powder were added to a commercial $Si_3N_4$ powder of 0.5 μm average grain size—and further in which, after 20 wt. % of a metallic Zr powder of 1 μm average grain size had been added, graphite powder of 5 μm average grain size was added in the proportions listed in Table III and the powders blended—was carried out by a ball milling method using $Si_3N_4$ balls, at an acceleration of 10 G.

the composite powders under the transmission electron microscope indicated that the average grain size was 3 μm or less.

Next, ceramic composites utilizing the composite powders just described were produced by sintering the powders within a vacuum atmosphere under 1150° C. sintering-temperature, 1000 MPa sintering-pressure conditions. Temperature measurement was by gauging the surface temperature of the molding dies with an infrared optical pyrometer.

After grinding and lapping operations on the obtained ceramic composites were implemented, average-crystal-grain-size, open-porosity, and bending-strength evaluations of the composites were carried out. Then, to ascertain the mold releasability in die-molding optical glass, an evaluation was conducted using borosilicate glass (Pyrex). In the evaluation method, the present ceramic composites were cut into 20-mm gauge lengths and then superficially lap-polished to a surface roughness of 0.02 μm (Ra), and used as molds to press 10-mm gauge lengths of the foregoing borosilicate glass (Pyrex) 60 seconds under 72000 molding-temperature, 10 MPa molding-pressure conditions. Carrying out 100 glass-molding test runs, a mold-releasability evaluation with the following content was conducted. Initially, after the molding operation was finished, the borosilicate glass (Pyrex) was parted from the dies without applying external force, and then in examining the external appearance of the borosilicate glass (Pyrex), those items without chips, cracks, or clouding, and in which the roughness in the post-molding transfer surface of the borosilicate glass (Pyrex) was 0.03 μm or less (Ra) were judged acceptable. The mold releasability (%) was defined as the percentage numerical value in which the number of passing items was divided by the number of molding test runs. For example, if in 100 molding test runs 50 passing items were obtained, then the mold releasability would be 50%. The results of the releasability evaluation are set forth in Table IV.

TABLE IV

| Test No. | Graphite qty. (wt. %) | Open porosity (%) | Avg. grain size (μm) | Bending Strength (MPa) | Releasability from borosilicate glass (Pyrex) (%) |
|---|---|---|---|---|---|
| 2-1* | 1 | 2.3 | 4.7 | 1120 | 18 |
| 2-2 | 2 | 0.8 | 2.8 | 1100 | 59 |
| 2-3 | 20 | 0.3 | 2.1 | 918 | 97 |
| 2-4 | 40 | 0.2 | 1.7 | 717 | 100 |
| 2-5 | 70 | 0.3 | 1.9 | 414 | 100 |
| 2-6 | 98 | 0.9 | 2.6 | 112 | 91 |
| 2-7* | 99 | did not sinter | did not sinter | did not sinter | did not sinter |

Borosilicate glass (Pyrex) releasability test:
Pressed 60 s under 720° C./10 MPa pressuring conditions
Test-run count n = 100

The results in Table IV indicate that in those ceramic composites whose graphite content was 2 to 98 wt. %, the open porosity was less than 1%, and the average crystal-grain size came in at 3 μm or less. Further, the releasability for borosilicate glass (Pyrex) of the mold samples containing a 20 to 98 wt. % proportion of graphite was an extraordinarily favorable 90% or greater, while even in the sample in which the content proportion was 2%, the mold releasability was nearly 60%; thus it was shown that the composites were sufficiently usable for molds. Meanwhile, in the sample in which the graphite content was 1 wt. %, the mold releasability worsened seriously. In turn, in those composite composites whose graphite content exceeded 90 wt. %, sintering proved to be problematic; with a content of 98 wt. %, sintered forms were manufacturable in one out of several attempts, but with a graphite content going over 99 wt. %, producing sintered forms proved to be utterly impossible.

Embodiment 3

Blended powders were produced by combining, in the formulations set forth in Table V, 40 wt. % of ceramic powder (1)—as indicated in Table V—of 0.5 μm average grain size, 20 wt. % of ceramic powder (2) of 0.5 μm average grain size, and as the remainder carbon powder of no greater than 5 μm average grain size and—added according to necessity—sintering additives, and employing a ball mill to mix the combinations at an acceleration of 10 G.

TABLE V

| Test No. | Ceramic Powder (1) | Ceramic Powder (2) | Carbon | Sintering additive |
|---|---|---|---|---|
| 3-1 | SiC | ZrCn | C | 2.5 wt. % $Y_2O_3$ + 1 wt. % $Al_2O_3$ |
| 3-2 | $Si_3N_4$ | TiCN | GC | 2.5 wt. % $Y_2O_3$ + 1 wt. % $Al_2O_3$ |
| 3-3 | AlN | CrN | C | 0.6 wt. % $Y_2O_3$ |
| 3-4 | $Al_2O_3$ | $MoO_2$ | C | — |
| 3-5 | 3Y—$ZrO_2$* | WC | GC | — |
| 3-6 | SiC | VN | GC | 2.5 wt. % $Y_2O_3$ + 1 wt. % $Al_2O_3$ |
| 3-7 | $Si_3N_4$ | TiCO | C | 2.5 wt. % $Y_2O_3$ + 1 wt. % $Al_2O_3$ |
| 3-8 | Spinel | NbHfC | $C_{60}$ | 0.6 wt. % $Y_2O_3$ |
| 3-9 | β-SiAlON | TaNbC | CNT | — |

TABLE V-continued

| Test No. | Ceramic Powder (1) | Ceramic Powder (2) | Carbon | Sintering additive |
|---|---|---|---|---|
| 3-10 | Mullite | TaNbN | Carbon black | — |

*3Y—$ZrO_2$: $ZrO_2$ stabilized with 3 wt. % $Y_2O_3$

Observation under the transmission electron microscope of the obtained composite powders indicated that the average crystal-grain size was 3 μm or less.

Next, ceramic composites utilizing the composite powders just described were manufactured by sintering the powders within a vacuum atmosphere under 1150° C. sintering-temperature, 1000 MPa sintering-pressure conditions. Temperature measurement in manufacturing the composites was by gauging the surface temperature of the molding dies with an infrared optical pyrometer.

After grinding and lapping operations on the obtained ceramic composites were implemented, open-porosity, average-crystal-grain-size, and bending-strength evaluations of the composites were carried out. Then, in order to ascertain the transfer precision and mold releasability in die-molding optical glass, 100 test molding runs using borosilicate glass (Pyrex) were performed in the same way as in Embodiment 2 to evaluate the mold releasability. The results of the evaluations and tests are set forth in Table VI.

TABLE VI

| Test No. | Open porosity (%) | Avg. grain size (μm) | Bending strength (MPa) | Releasability from borosilicate glass (Pyrex) (%)* |
|---|---|---|---|---|
| 3-1 | 0.3 | 1.4 | 433 | 100 |
| 3-2 | 0.2 | 1.7 | 720 | 100 |
| 3-3 | 0.4 | 1.8 | 428 | 100 |
| 3-4 | 0.5 | 2.3 | 287 | 100 |
| 3-5 | 0.2 | 1.6 | 686 | 100 |
| 3-6 | 0.2 | 1.6 | 728 | 100 |
| 3-7 | 0.3 | 1.7 | 720 | 100 |
| 3-8 | 0.4 | 1.7 | 402 | 100 |
| 3-9 | 0.4 | 2.2 | 416 | 100 |
| 3-10 | 0.2 | 1.7 | 337 | 100 |

*Pressed 60 s under 720° C./10 MPa pressuring conditions
Test-run count n = 100

Embodiment 4

Utilizing 0.5 μm average-grain-size ceramic powders as indicated in Table VII, and having the remainder be carbon powder of 5 μm or less average grain size, and adding to this combination sintering additive according to necessity, blended powders were produced by combining, in the formulations set forth in Table VII, the materials and employing a ball mill to mix the combinations at an acceleration of 10 G.

TABLE VII

| Ceramic powder & sintering additive utilized | | Graphite |
|---|---|---|
| Ceramic powder | Sintering additive | amt. (wt. %) |
| SiC | 2.5 wt. % $Y_2O_3$ + 1 wt. % $Al_2O_3$ | 1† |
| $Si_3N_4$ | 2.5 wt. % $Y_2O_3$ + 1 wt. % $Al_2O_3$ | 2 |
| AlN | 0.6 wt. % $Y_2O_3$ | 10 |

TABLE VII-continued

| Ceramic powder & sintering additive utilized | | Graphite |
|---|---|---|
| Ceramic powder | Sintering additive | amt. (wt. %) |
| $Al_2O_3$ | — | 20 |
| $3Y—ZrO_2$* | — | 40 |
| | | 70 |
| | | 90 |
| | | 98 |
| | | 99† |

*$3Y—ZrO_2$: $ZrO_2$ stabilized with 3 wt. % $Y_2O_3$
†Comparative example

Observation under the transmission electron microscope of the obtained powder blends indicated that the average crystal-grain size was 3 μm or less. Next, ceramic composites were produced by sintering these powder blends under 1150° C. sintering-temperature, 1000 MPa sintering-pressure conditions, within an $N_2$-gas atmosphere with the samples in which the ceramic powders were respectively $Si_3N_4$ and AlN, and within an Ar-gas atmosphere with the samples in which the ceramic powders were respectively SiC, $Al_2O_3$, and $3Y—ZrO_2$ ($ZrO_2$ stabilized with 3 wt. %$Y_2O_3$). Temperature measurement in producing the composites was by gauging the surface temperature of the molding dies with an infrared optical pyrometer.

After grinding and lapping operations on the obtained ceramic composites were implemented, open-porosity, average-crystal-grain-size, and bending-strength evaluations of the composites were carried out. Then, in order to ascertain the transfer precision and mold releasability in die-molding optical glass, 100 test molding runs using borosilicate glass (Pyrex) were performed in the same way as in Embodiment 2 to evaluate the mold releasability. The results of evaluations and tests are set forth in Tables VIII.

TABLES VIII

| | | Graphite content (%) | | | | | | | | |
|---|---|---|---|---|---|---|---|---|---|---|
| | | 1* | 2 | 10 | 20 | 40 | 70 | 90 | 98 | 99* |
| Open porosity (%) | | | | | | | | | | |
| Ceramic Powder | SiC | 3.0 | 0.9 | 0.6 | 0.3 | 0.3 | 0.4 | 0.6 | 0.8 | did not sinter |
| | $Si_3N_4$ | 2.5 | 0.8 | 0.5 | 0.3 | 0.2 | 0.3 | 0.6 | 0.9 | did not sinter |
| | AlN | 2.8 | 0.9 | 0.6 | 0.4 | 0.3 | 0.4 | 0.6 | 1 | did not sinter |
| | $Al_2O_3$ | 3.2 | 0.9 | 0.7 | 0.5 | 0.3 | 0.4 | 0.5 | 0.8 | did not sinter |
| | $3Y—ZrO_2$ | 3.1 | 0.9 | 0.6 | 0.4 | 0.3 | 0.4 | 0.6 | 0.9 | did not sinter |
| Avg. grain size (μm) | | | | | | | | | | |
| Ceramic Powder | SiC | 4.8 | 2.8 | 2.6 | 2.3 | 2 | 2.1 | 2.4 | 2.8 | did not sinter |
| | $Si_3N_4$ | 5.1 | 3 | 2.7 | 2.5 | 2.1 | 2.2 | 2.4 | 2.9 | did not sinter |
| | AlN | 5.6 | 3 | 2.8 | 2.6 | 2.3 | 2.3 | 2.7 | 3 | did not sinter |
| | $Al_2O_3$ | 5.5 | 2.9 | 2.8 | 2.6 | 2.2 | 2.3 | 2.6 | 2.9 | did not sinter |
| | $3Y—ZrO_2$ | 5.2 | 2.8 | 2.7 | 2.5 | 2.1 | 2.2 | 2.3 | 2.7 | did not sinter |
| Bending strength (MPa) | | | | | | | | | | |
| Ceramic Powder | SiC | 715 | 703 | 654 | 592 | 469 | 285 | 162 | 101 | did not sinter |
| | $Si_3N_4$ | 1030 | 1012 | 938 | 845 | 660 | 383 | 198 | 106 | did not sinter |
| | AlN | 415 | 409 | 383 | 352 | 288 | 193 | 130 | 98 | did not sinter |
| | $Al_2O_3$ | 620 | 610 | 568 | 516 | 412 | 256 | 152 | 100 | did not sinter |
| | $3Y—ZrO_2$ | 980 | 962 | 892 | 804 | 629 | 365 | 190 | 102 | did not sinter |
| Releasability from borosilicate glass (Pyrex) (%) | | | | | | | | | | |
| Ceramic Powder | SiC | 21 | 62 | 83 | 96 | 100 | 100 | 94 | 89 | did not sinter |
| | $Si_3N_4$ | 19 | 56 | 80 | 97 | 100 | 100 | 92 | 86 | did not sinter |

TABLES VIII-continued

| | Graphite content (%) | | | | | | | | |
|---|---|---|---|---|---|---|---|---|---|
| | 1* | 2 | 10 | 20 | 40 | 70 | 90 | 98 | 99* |
| AlN | 17 | 59 | 78 | 94 | 100 | 100 | 93 | 87 | did not sinter |
| Al$_2$O$_3$ | 12 | 51 | 72 | 90 | 100 | 100 | 89 | 82 | did not sinter |
| 3Y—ZrO$_2$ | 18 | 61 | 81 | 92 | 100 | 100 | 94 | 88 | did not sinter |

*Comp. ex.
Borosilicate glass (Pyrex) releasability test:
Pressed 60 s under 720° C./10 MPa pressuring conditions
Test-run count n = 100

Embodiment 5

Within a nitrogen atmosphere at 0.1 MPa, mixing of a powder in which 2.5 wt. % Y$_2$O$_3$ powder as a sintering additive and 1 wt. % Al$_2$O$_3$ powder were added to a commercial SiC powder of 0.5 μm average grain size—and further in which 20 wt. % of a metallic CrN powder of 3 μm average grain size and 40 wt. % graphite powder of 5 μm average grain size had been added—was carried out by a ball milling method using SiC balls, at an acceleration of 10 G.

Qualitative analysis of the obtained composite powder was carried out by XRD, wherein SiC, CrN, CrCN, CrC, and C peaks could be confirmed. Moreover, observation of the composite powder under the transmission electron microscope indicated that the average crystal-grain size was 3 μm or less.

Next, the composite powder just described was sintered within a vacuum atmosphere under the conditions entered in Table IX to yield ceramic composites. Temperature measurement in producing the composites was by gauging the surface temperature of the molding dies with an infrared optical pyrometer.

TABLE IX

| Adopted temp. & press. conditions during sintering | |
|---|---|
| Sintering temp. | Sintering press. |
| 400° C.* | 100 MPa* |
| 600° C.* | 200 MPa |

TABLE IX-continued

| Adopted temp. & press. conditions during sintering | |
|---|---|
| Sintering temp. | Sintering press. |
| 800° C. | 500 MPa |
| 1150° C. | 1000 MPa |
| 1500° C. | 5000 MPa |
| 1700° C.* | |

*Comparative examples

After grinding and lapping operations on the obtained ceramic composites were implemented, in order to ascertain the conformational transfer precision and mold releasability in die-molding optical glass, 100 test molding runs using borosilicate glass (Pyrex) were performed in the same way as in Embodiment 2 to evaluate the mold releasability. The results of the tests are set forth in Table X.

TABLE X

| | | Sintering pressure (MPa) | | | | | |
|---|---|---|---|---|---|---|---|
| | | 100* | 200 | 500 | 1000 | 5000 | |
| Sintering temperature (° C.) | 400* | did not sinter | did not sinter | did not sinter | ruined | ruined | Releasability from borosilicate glass (Pyrex) (%) |
| | 600* | ruined | ruined | ruined | 37 | 61 | |
| | 800 | ruined | 86 | 91 | 99 | 100 | |
| | 1150 | 15 | 89 | 94 | 100 | 100 | |

TABLE X-continued

|  | Sintering pressure (MPa) | | | | |
|---|---|---|---|---|---|
|  | 100* | 200 | 500 | 1000 | 5000 |
| 1500 | 14 | 93 | 91 | 100 | 100 |
| 1700* | 11 | 17 | 14 | 19 | 18 |

*Comparative examples
Borosilicate glass (Pyrex) releasability test:
Pressed 60 s under 720° C./10 MPa pressuring conditions
Test-run count n = 100

The results in Table X evidenced that the releasability between borosilicate glass (Pyrex), and sintered forms produced utilizing conditions according to which the sintering temperature was 800 to 1500° C. and the sintering pressure was 200 MPa or more, was favorable. When the sintering temperature was 1700° C., however, grain growth advanced such that the mold releasability deteriorated pronouncedly. Meanwhile, in the 600° C. sintering-temperature samples, although those in which the sintering pressure was 1000 MPa or greater exhibited releasability, when ceramic composites obtained at sintering pressures lower than that level were utilized, the molds broke apart, unable to withstand the pressurizing forces during molding. Lastly, a sintering temperature of 400° C. proved to be prohibitive of yielding sintered forms.

Embodiment 6

Within a nitrogen atmosphere at 0.1 MPa, mixing of a powder in which 2.5 wt. % $Y_2O_3$ powder as a sintering additive and 1 wt. % $Al_2O_3$ powder were added to a commercial $Si_3N_4$ powder of 0.5 μm average grain size—and further in which 30 wt. % of a metallic Ti powder of 0.5 μm average grain size and 40 wt. % graphite powder of 5 μm average grain size had been added—was carried out for 12 hours by a ball milling method using $Si_3N_4$ balls, at an acceleration of 150 G.

Qualitative analysis of the obtained composite powder was carried out by XRD, wherein broad $Si_3N_4$, TiN, TiCN, TiC, and C peaks could be confirmed. Moreover, observation of the composite powder under the transmission electron microscope indicated that the average grain size was 30 nm or less.

Next, the composite powder produced in the foregoing way was sintered within a vacuum atmosphere under the conditions entered in Table XI to yield ceramic composites. Temperature measurement in producing the composites was by gauging the surface temperature of the molding dies with an infrared optical pyrometer.

TABLE XI

| Adopted temp. & press. conditions during sintering | |
|---|---|
| Sintering temp. | Sintering press. |
| 800° C. | 200 MPa |
| 1000° C. | 500 MPa |
| 1200° C. | 1000 MPa |
| 1400° C. | 5000 MPa |
| 1500° C. | 10,000 MPa |
| 1600° C.* | |

*Comparative example

After grinding and lapping operations on the obtained ceramic composites were implemented, measurement of the average crystal-grain size in 10 arbitrary locations on each ceramic composite was carried out using the transmission electron microscope. In turn, measurement of the open porosity of each was carried out using the mercury porosimeter. The results of these measurements are set forth in Tables XII.

TABLES XII

| | | Sintering pressure (MPa) | | | | | | | | |
|---|---|---|---|---|---|---|---|---|---|---|
| | | 200 | | | 500 | | | 1000 | | |
| | | Avg. grain size | Open porosity | Vickers hardness | Avg. grain size | Open porosity | Vickers hardness | Avg. grain size | Open porosity | Vickers hardness |
| Sintering temperature (° C.) | 800 | 17 nm | 0.4% | 10 GPa | 15 nm | 0.4% | 10 GPa | 10 nm | 0.3% | 12 GPa |
| | 1000 | 18 nm | 0.3% | 10 GPa | 15 nm | 0.2% | 10 GPa | 11 nm | 0.2% | 12 GPa |
| | 1200 | 21 nm | 0.2% | 10 GPa | 17 nm | 0.2% | 11 GPa | 14 nm | 0.1% | 13 GPa |
| | 1400 | 24 nm | 0.2% | 10 GPa | 18 nm | 0.2% | 11 GPa | 15 nm | 0.1% | 13 GPa |
| | 1500 | 29 nm | 0.5% | 10 GPa | 25 nm | 0.4% | 11 GPa | 22 nm | 0.4% | 13 GPa |
| | 1600* | 103 nm | 2.2% | 9 GPa | 96 nm | 2.1% | 10 GPa | 81 nm | 1.9% | 12 GPa |

| | | Sintering pressure (MPa) | | | | | |
|---|---|---|---|---|---|---|---|
| | | 5000 | | | 10,000 | | |
| | | Avg. grain size | Open porosity | Vickers hardness | Avg. grain size | Open porosity | Vickers hardness |
| Sintering temp (° C.) | 800 | 7 nm | 0.2% | 13 GPa | 6 nm | 0.2% | 13 GPa |
| | 1000 | 9 nm | 0.2% | 14 GPa | 7 nm | 0.1% | 15 GPa |

TABLES XII-continued

| 1200 | 11 nm | 0.1% | 15 GPa | 9 nm | 0.1% | 15 GPa |
| 1400 | 14 nm | 0.1% | 14 GPa | 13 nm | 0.1% | 14 GPa |
| 1500 | 19 nm | 0.3% | 13 GPa | 16 nm | 0.3% | 14 GPa |
| 1600* | 60 nm | 1.8% | 13 GPa | 47 nm | 1.7% | 13 GPa |

*Comparative example

The results in Tables XII evidenced that the average crystal-grain size of ceramic composites produced utilizing 800 to 1500° C. sintering-temperature and 200 to 5000 MPa sintering-pressure conditions was 30 nm or less. The sintering temperature going over 1600° C. led to grain growth advancing pronouncedly, such that the average crystal-grain size became larger than 30 nm, which meant that the surface roughness of the lap-polished areas on the ceramic composite surfaces was unable to sustain the desired precision.

From the results in Tables XII, it was evident that the open porosity of sintered forms in which the foregoing sintering conditions were utilized was, at less than 1%, quite favorable. When the open porosity was greater than 1%, if the ceramic composite was used as a glass-molding die for example, the glass entered into the pore regions, giving rise to problems with the mold releasability and with burrs occurring on the transfer surfaces, among other difficulties.

Embodiment 7

Within a nitrogen atmosphere at 0.1 MPa, mixing of a powder in which 2.5 wt. % $Y_2O_3$ powder as a sintering additive and 1 wt. % $Al_2O_3$ powder were added to a commercial $Si_3N_4$ powder of 0.5 μm average grain size—and further in which, after 30 wt. % of a metallic Ti powder of 0.5 μm average grain size had been added, graphite powder of 5 μm average grain size was added in the proportions listed in Table XII and the powders blended—was carried out for 12 hours by a ball milling method using $Si_3N_4$ balls, at an acceleration of 150 G.

TABLE XIII

| Test No. | Amt. added graphite within sintering powder (wt. %) |
|---|---|
| 7-1* | 1 |
| 7-2 | 2 |
| 7-3 | 20 |
| 7-4 | 40 |
| 7-5 | 60 |
| 7-6 | 80 |
| 7-7 | 98 |
| 7-8* | 99 |

*Comparative example

Qualitative analysis of the obtained composite powders was carried out by XRD, wherein broad $Si_3N_4$, TiN, TiCN, TiC, and C peaks could be confirmed. Moreover, observation of the composite powders under the transmission electron microscope indicated that the average grain size was 30 nm or less.

Next, ceramic composites utilizing the composite powders just described were produced by sintering the powders within a vacuum atmosphere under 1200° C. sintering-temperature, 1000 MPa sintering-pressure conditions. Temperature measurement in producing the composites was by gauging the surface temperature of the molding dies with an infrared optical pyrometer.

After grinding and lapping operations on the obtained ceramic composites were implemented, average-crystal-grain-size, open-porosity, and bending-strength evaluations of the composites were carried out. Then, to ascertain the mold releasability in die-molding optical glass, an evaluation was conducted using borosilicate glass (Pyrex). In the evaluation method, the present ceramic composites were cut into 20-mm gauge lengths and then superficially lap-polished to a surface roughness of 0.02 μm (Ra), and used as molds to press 10-mm gauge lengths of the foregoing borosilicate glass (Pyrex) 60 seconds under 720° C. molding-temperature, 10 MPa molding-pressure conditions. Carrying out 500 glass-molding test runs, a mold-releasability evaluation with the following content was conducted. Initially, after the molding operation was finished, the borosilicate glass (Pyrex) was parted from the dies without applying external force, and then in examining the external appearance of the borosilicate glass (Pyrex), those items without chips, cracks, or clouding, and in which the roughness in the post-molding transfer surface of the borosilicate glass (Pyrex) was 0.03 μm or less (Ra) were judged acceptable. The mold releasability (%) was defined as the percentage numerical value in which the number of passing items was divided by the number of molding test runs. For example, if in 500 molding test runs 50 passing items were obtained, then the mold releasability would be 10%. The results of the releasability evaluation are set forth in Table XIV.

TABLE XIV

| Test No. | Graphite qty. (wt. %) | Open porosity (%) | Avg. grain size (nm) | Bending strength (MPa) | Releasability from borosilicate glass (Pyrex) (%) |
|---|---|---|---|---|---|
| 7-1* | 1 | 1.4 | 53 | 1350 | 23 |
| 7-2 | 2 | 0.4 | 28 | 1326 | 64 |
| 7-3 | 20 | 0.2 | 19 | 1107 | 99 |
| 7-4 | 40 | 0.1 | 14 | 863 | 100 |
| 7-5 | 60 | 0.2 | 15 | 620 | 100 |
| 7-6 | 80 | 0.3 | 15 | 377 | 98 |

TABLE XIV-continued

| Test No. | Graphite qty. (wt. %) | Open porosity (%) | Avg. grain size (nm) | Bending strength (MPa) | Releasability from borosilicate glass (Pyrex) (%) |
|---|---|---|---|---|---|
| 7-7 | 98 | 0.6 | 17 | 134 | 96 |
| 7-8* | 99 | did not sinter | did not sinter | did not sinter | did not sinter |

Borosilicate glass (Pyrex) releasability test:
Pressed 60 s under 720° C./10 MPa pressuring conditions
Test-run count n = 500

The results in Table XIV indicate that in those ceramic composites whose graphite content was 2 to 98 wt. %, the open porosity was less than 1%, and the average grain size came in at 30 nm or less. Further, the releasability for borosilicate glass (Pyrex) of the mold samples containing a 20 to 98 wt. % proportion of graphite was an extraordinarily favorable 90% or greater, while even in the sample in which the content proportion was 2%, the mold releasability was 60% or better; thus it was shown that the composites were sufficiently usable for molds. Meanwhile, in the sample in which the graphite content was 1 wt. %, the mold releasability worsened seriously. In turn, in those composite composites whose graphite content exceeded 90 wt. %, sintering proved to be problematic; with a content of 98 wt. %, sintered forms were manufacturable in one out of several attempts, but with a graphite content going over 99 wt. %, producing sintered forms proved to be utterly impossible.

Embodiment 8

Blended powders were produced by combining, in the formulations set forth in Table XV, 40 wt. % of ceramic powder (1)—as indicated in Table XV—of 0.5 μm average grain size, 20 wt. % of ceramic powder (2) of 0.5 μm average grain size, and as the remainder carbon powder of no greater than 5 μm average grain size and—added according to necessity—sintering additives, and employing a ball mill to mix the combinations for 12 hours at an acceleration of 150 G.

TABLE XV

| Test No. | Ceramic Powder (1) | Ceramic Powder (2) | Carbon | Sintering additive |
|---|---|---|---|---|
| 8-1 | SiC | ZrCn | C | 1 wt. % $Al_2O_3$ |
| 8-2 | $Si_3N_4$ | TiCN | GC | 2.5 wt. % $Y_2O_3$ + 1 wt. % $Al_2O_3$ |
| 8-3 | AlN | CrN | C | 0.6 wt. % $Y_2O_3$ |
| 8-4 | $Al_2O_3$ | $MoO_2$ | C | — |
| 8-5 | $3Y-ZrO_2$ | WC | GC | — |
| 8-6 | SiC | VN | GC | 1 wt. % $Al_2O_3$ |
| 8-7 | $Si_3N_4$ | TiCO | C | 2.5 wt. % $Y_2O_3$ + 1 wt. % $Al_2O_3$ |
| 8-8 | Spinel | NbHfC | $C_{60}$ | 0.6 wt. % $Y_2O_3$ |
| 8-9 | β-SiAlON | TaNbC | CNT | — |
| 8-10 | Mullite | TaNbN | Carbon black | — |
| 8-11 | $Si_3N_4$ | TiCN | CNF | — |

Observation under the transmission electron microscope of the obtained composite powders indicated that the average grain size was 30 nm or less.

Next, ceramic composites utilizing the composite powders just described were manufactured by sintering the powders within a vacuum atmosphere under 1200° C. sintering-temperature, 1000 MPa sintering-pressure conditions. Temperature measurement in manufacturing the composites was by gauging the surface temperature of the molding dies with an infrared optical pyrometer.

After grinding and lapping operations on the obtained ceramic composites were implemented, open-porosity, average-grain-size, and bending-strength evaluations of the composites were carried out. Then, in order to confirm the mold-releasability rating in die-molding Pyrex optical glass, the mold releasability status after pressing the borosilicate glass (Pyrex) under 720° C., 10 MPa conditions was evaluated by performing 500 test molding runs in the same way as in Embodiment 7. The results of the evaluations are set forth in Table XVI.

TABLE XVI

| Test No. | Open porosity (%) | Avg. grain size (nm) | Bending strength (MPa) | Releasability from borosilicate glass (Pyrex) (%)* |
|---|---|---|---|---|
| 8-1 | 0.2 | 15 | 514 | 100 |
| 8-2 | 0.1 | 14 | 860 | 100 |
| 8-3 | 0.2 | 16 | 508 | 100 |
| 8-4 | 0.1 | 20 | 341 | 100 |
| 8-5 | 0.1 | 14 | 815 | 100 |
| 8-6 | 0.1 | 13 | 508 | 100 |
| 8-7 | 0.1 | 16 | 860 | 100 |
| 8-8 | 0.2 | 15 | 61 | 100 |
| 8-9 | 0.2 | 21 | 547 | 100 |
| 8-10 | 0.1 | 18 | 39 | 100 |
| 8-11 | 0.2 | 20 | 800 | 100 |

*Pressed 60 s under 720° C./10 MPa pressuring conditions
Test-run count n = 500

Embodiment 9

Utilizing 0.5 μm average-grain-size ceramic powders as indicated in Table XVII, and having the remainder be carbon powder of 5 μm or less average grain size, and adding to this combination sintering additive according to necessity, blended powders were produced by rendering combinations in the formulations set forth in Table XVII, and employing a ball mill to mix the combinations at an acceleration of 150 G for 12 hours.

Observation under the transmission electron microscope of the obtained composite powders indicated that the average crystal-grain size was 30 nm or less.

TABLE XVII

| Ceramic powder & sintering additive utilized | | Graphite |
|---|---|---|
| Ceramic powder | Sintering additive | amt. (wt. %) |
| SiC | 1 wt. % $Al_2O_3$ | 1† |
| $Si_3N_4$ | 2.5 wt. % $Y_2O_3$ + 1 wt. % $Al_2O_3$ | 2 |

TABLE XVII-continued

| Ceramic powder & sintering additive utilized | | Graphite |
|---|---|---|
| Ceramic powder | Sintering additive | amt. (wt. %) |
| AlN | 0.6 wt. % $Y_2O_3$ | 10 |
| $Al_2O_3$ | — | 20 |
| 3Y—$ZrO_2$* | — | 40 |
| | | 60 |
| | | 80 |
| | | 90 |
| | | 98 |
| | | 99† |

*3Y—$ZrO_2$: $ZrO_2$ stabilized with 3 wt. % $Y_2O_3$
†Comparative example

Next, ceramic composites were produced by sintering the above-noted powder blends under 1200° C. sintering-temperature, 1000 MPa sintering-pressure conditions, within an $N_2$-gas atmosphere with the samples in which the ceramic powders were respectively $Si_3N_4$ and AlN, and within an Ar-gas atmosphere with the samples in which the ceramic powders were respectively SiC, $Al_2O_3$, and 3Y—$ZrO_2$ ($ZrO_2$ stabilized with 3 wt. % $Y_2O_3$). Temperature measurement in producing the composites was by gauging the surface temperature of the molding dies with an infrared optical pyrometer.

After grinding and lapping operations on the obtained ceramic composites were implemented, open-porosity, average-grain-size, and bending-strength evaluations of the composites were carried out. Then, in order to ascertain the transfer precision and mold releasability in die-molding optical glass, evaluations were done by performing 500 test molding runs in the same way as in Embodiment 7, using borosilicate glass (Pyrex). The results of evaluations and tests are set forth in Tables XVIII.

TABLES XVIII

| | | Graphite content (%) | | | | | | | | |
|---|---|---|---|---|---|---|---|---|---|---|
| | | 1* | 2 | 10 | 20 | 40 | 60 | 80 | 90 | 98 | 99* |
| Open porosity (%) | | | | | | | | | | | |
| Ceramic Powder | SiC | 1.4 | 0.5 | 0.2 | 0.1 | 0.1 | 0.1 | 0.2 | 0.3 | 0.7 | didn't sinter |
| | $Si_3N_4$ | 1.4 | 0.4 | 0.2 | 0.1 | 0.1 | 0.1 | 0.2 | 0.2 | 0.6 | didn't sinter |
| | AlN | 1.6 | 0.6 | 0.3 | 0.2 | 0.2 | 0.2 | 0.3 | 0.3 | 0.7 | didn't sinter |
| | $Al_2O_3$ | 1.5 | 0.6 | 0.3 | 0.2 | 0.1 | 0.1 | 0.2 | 0.2 | 0.8 | didn't sinter |
| | 3Y—$ZrO_2$ | 1.4 | 0.4 | 0.2 | 0.1 | 0.1 | 0.1 | 0.2 | 0.3 | 0.6 | didn't sinter |
| Avg. grain size (μm) | | | | | | | | | | | |
| Ceramic Powder | SiC | 52 | 26 | 20 | 17 | 15 | 16 | 17 | 19 | 21 | didn't sinter |
| | $Si_3N_4$ | 54 | 24 | 18 | 15 | 14 | 14 | 15 | 17 | 20 | didn't sinter |
| | AlN | 62 | 27 | 19 | 17 | 16 | 16 | 17 | 17 | 22 | didn't sinter |
| | $Al_2O_3$ | 60 | 30 | 21 | 18 | 17 | 17 | 18 | 18 | 24 | didn't sinter |
| | 3Y—$ZrO_2$ | 56 | 26 | 19 | 16 | 14 | 14 | 15 | 16 | 21 | didn't sinter |
| Bending strength (MPa) | | | | | | | | | | | |
| Ceramic Powder | SiC | 780 | 767 | 715 | 650 | 520 | 390 | 260 | 195 | 130 | didn't sinter |
| | $Si_3N_4$ | 1265 | 1242 | 1152 | 1040 | 815 | 589 | 364 | 252 | 139 | didn't sinter |
| | AlN | 530 | 522 | 490 | 449 | 368 | 288 | 207 | 166 | 126 | didn't sinter |
| | $Al_2O_3$ | 775 | 762 | 711 | 646 | 517 | 389 | 260 | 195 | 131 | didn't sinter |
| | 3Y—$ZrO_2$ | 1210 | 1189 | 1103 | 995 | 780 | 566 | 351 | 243 | 136 | didn't sinter |
| Releasability from borosilicate glass (Pyrex) (%) | | | | | | | | | | | |
| Ceramic Powder | SiC | 24 | 65 | 84 | 98 | 100 | 100 | 100 | 100 | 93 | didn't sinter |
| | $Si_3N_4$ | 20 | 61 | 81 | 99 | 100 | 100 | 100 | 100 | 95 | didn't sinter |

TABLES XVIII-continued

| | Graphite content (%) | | | | | | | | |
|---|---|---|---|---|---|---|---|---|---|
| | 1* | 2 | 10 | 20 | 40 | 60 | 80 | 90 | 98 | 99* |
| AlN | 21 | 63 | 79 | 93 | 100 | 100 | 100 | 98 | 91 | didn't sinter |
| Al$_2$O$_3$ | 18 | 60 | 75 | 90 | 100 | 100 | 99 | 96 | 90 | didn't sinter |
| 3Y—ZrO$_2$ | 22 | 63 | 83 | 94 | 100 | 100 | 100 | 100 | 92 | didn't sinter |

*Comp. ex.
Borosilicate glass (Pyrex) releasability test:
Pressed 60 s under 720° C./10 MPa pressuring conditions

Embodiment 10

Within a nitrogen atmosphere at 0.1 MPa, mixing of a powder in which 2.5 wt. % Y$_2$O$_3$ powder as a sintering additive and 1 wt. % Al$_2$O$_3$ powder were added to a commercial SiC powder of 0.5 μm average grain size—and further in which 20 wt. % of a metallic CrN powder of 3 μm average grain size and 40 wt. % graphite powder of 5 μm average grain size had been added—was carried out for 12 hours by a ball milling method using SiC balls, at an acceleration of 150 G.

Qualitative analysis of the obtained composite powder was carried out by XRD, wherein broad SiC, CrN, CrCN, CrC, and C peaks could be confirmed. Moreover, observation of the composite powder under the transmission electron microscope indicated that the average crystal-grain size was 30 nm or less.

Next, the composite powder just described was sintered within a vacuum atmosphere under the conditions entered in Table XIX to yield ceramic composites. Temperature measurement in producing the composites was by gauging the surface temperature of the molding dies with an infrared optical pyrometer.

TABLE XIX

| Adopted temp. & press. conditions during sintering | |
|---|---|
| Sintering temp. | Sintering press. |
| 400° C.* | 100 MPa* |
| 600° C.* | 200 MPa |
| 800° C. | 500 MPa |
| 1000° C. | 1000 MPa |
| 1200° C. | 5000 MPa |
| 1400° C. | 10,000 MPa |
| 1500° C. | |
| 1600° C.* | |

*Comparative examples

After grinding and lapping operations on the obtained ceramic composites were implemented, in order to confirm the mold-releasability rating in die-molding Pyrex optical glass, the mold releasability status after pressing the borosilicate glass (Pyrex) under 720° C., 10 MPa conditions was evaluated by performing 500 test molding runs in the same way as in Embodiment 7. The results of the evaluations are set forth in Table XX.

TABLE XX

| | | Sintering pressure (MPa) | | | | | | |
|---|---|---|---|---|---|---|---|---|
| | | 100* | 200 | 500 | 1000 | 5000 | 10,000 | |
| Sintering temperature (° C.) | 400* | did not sinter | did not sinter | did not sinter | ruined | ruined | ruined | Releasability from borosilicate glass (Pyrex) (%) |
| | 600* | ruined | ruined | ruined | 43 | 66 | 69 | |
| | 800 | ruined | 90 | 95 | 100 | 100 | 100 | |
| | 1000 | 13 | 91 | 96 | 100 | 100 | 100 | |
| | 1200 | 15 | 93 | 97 | 100 | 100 | 100 | |
| | 1400 | 16 | 92 | 99 | 100 | 100 | 100 | |
| | 1500 | 17 | 92 | 99 | 100 | 100 | 100 | |
| | 1600* | 15 | 18 | 16 | 22 | 21 | 23 | |

*Comparative examples
Borosilicate glass (Pyrex) releasability test:
Pressed 60 s under 720° C./10 MPa pressuring conditions
Test-run count n = 500

The results in Table XX evidenced that the releasability between borosilicate glass (Pyrex), and sintered forms produced utilizing conditions according to which the sintering temperature was 800 to 1500° C. and the sintering pressure was 200 MPa or more, was favorable. When the sintering temperature was 1600° C., however, grain growth advanced such that the mold releasability deteriorated pronouncedly. Meanwhile, in the 600° C. sintering-temperature samples, although those in which the sintering pressure was 1000 MPa or greater exhibited releasability, when sintered forms obtained at sintering pressures lower than that level were utilized, the molds broke apart, unable to withstand the pressurizing forces during molding. Lastly, a sintering temperature of 400° C. proved to be prohibitive of yielding sintered forms.

Embodiment 11

Within a nitrogen atmosphere at 0.1 MPa, mixing of respective powders in which, without adding a sintering additive, graphite powder of 5 μm average grain size was added in the proportions given in Table XXI to a commercial SiC powder of 0.5 μm average grain size, was carried out for 12 hours by a ball milling method using $Si_3N_4$ balls, at an acceleration of 150 G.

TABLE XXI

| Ceramic (SiC) (weight parts) | Graphite (weight parts) |
| --- | --- |
| 99 | 1 |
| 98 | 2 |
| 90 | 10 |
| 80 | 20 |
| 60 | 40 |
| 40 | 60 |
| 20 | 80 |
| 10 | 90 |
| 2 | 98 |
| 1 | 99 |

Qualitative analysis of the obtained composite powders was carried out by XRD, wherein broad SiC and C peaks could be confirmed. Moreover, observation of the composite powders under the transmission electron microscope indicated that the average grain size was 30 nm or less.

Next, ceramic composites utilizing the composite powders just described were produced by sintering the powders within a vacuum atmosphere under 1200° C. sintering-temperature, 1000 MPa sintering-pressure conditions. Temperature measurement in producing the composites was by gauging the surface temperature of the molding dies with an infrared optical pyrometer.

To ascertain the releasability in sinter-molding ZnS ceramic with molds utilizing the obtained ceramic composites, evaluations using commercial ZnS powder were carried out. In the evaluation method, the present ceramic composites were cut into 20-mm gauge lengths and then superficially lap-polished to a surface roughness of 0.02 μm (Ra), and used as molds to press 20-mm gauge lengths of the foregoing ZnS ceramic under 1000° C. sintering-temperature, 50 MPa molding-pressure conditions. Carrying out 100 molding test runs, a mold-releasability evaluation with the following content was conducted. Initially, after the molding operation was finished, the ZnS ceramic was parted from the dies without applying external force, and then those items without chips, cracks, or discoloration in the post-molding ZnS ceramic, and in which the roughness in the post-molding transfer surface of the ZnS ceramic was 0.03 μm or less (Ra) were judged acceptable. The mold releasability (%) was defined as the percentage numerical value in which the number of passing items was divided by the number of molding test runs. For example, if in 100 molding test runs 50 passing items were obtained, then the mold releasability would be 50%. The results of the releasability evaluation are set forth in Table XXII.

TABLE XXII

| Mold material | Graphite content (weight parts) | 1 | 2 | 10 | 20 | 40 | 60 | 80 | 98 | 99 |
| --- | --- | --- | --- | --- | --- | --- | --- | --- | --- | --- |
| | SiC content (weight parts) | 99 | 98 | 90 | 80 | 60 | 40 | 20 | 2 | 1 |
| Evaluation results | Releasability (%) | 0 | 0 | 12 | 86 | 100 | 100 | 100 | 67* | mold broke |

*Mold broke apart in 68$^{th}$ test run
Sintering conditions: 1200° C.; 1000 MPa

INDUSTRIAL APPLICABILITY

Inasmuch as ceramic composites of the present invention have outstanding wear-resistant and low-friction properties, as well as superior mold-releasability for glass, resins, and ceramics, among other materials, the utility of the composites as machining-tool, sliding-component, and mold-die materials is first-rate.

What is claimed is:

1. A method of manufacturing a ceramic composite, the composite characterized in comprising a phase having as its principal component, at a content of 40 to 98 wt. %, a pure carbon allotrope of 30 nm or less average phase size, said carbon being one selected from graphite, amorphous carbon, carbon black, and fullerenes, and the composite characterized in comprising a ceramic phase having an average grain size of 30 nm or less and constituted by a ceramic matrix that excludes pure carbon; the method characterized in that a powder blend, having an average particle size of 30 nm or less, of a ceramic powder and of a carbon powder is molded, and the obtained molded form is sintered within a non-oxidizing atmosphere at a sintering temperature of 800 to 150000 and a sintering pressure of 1000 MPa or more.

2. A method of manufacturing a ceramic composite, the ceramic composite characterized in comprising a phase having as its principal component, at a content of 40 to 98 wt. %, a pure carbon allotrope of 30 nm or less average phase size, said carbon being one selected from graphite, amorphous carbon, carbon black, and fullerenes, and the composite characterized in comprising a ceramic phase having an average grain size of 30 nm or less and constituted from at least one selected from the group made up of nitrides, carbides, composite nitrides, composite carbides, and carbonitrides of Si, Hf, V, Nb, Ta, Cr, Mo and W, the ceramic phase therein constituted by a ceramic matrix that excludes pure carbon allotropes; the method characterized in that a powder blend of a ceramic powder constituting said ceramic phase is molded together with a carbon powder, and the obtained molded form is sintered within a non-oxidizing atmosphere at a sintering temperature of 800 to 150000 and a sintering pressure of 1000 MPa or more.

3. A ceramic composite characterized in comprising:
a phase having as its principal component, at a content of 40 to 98 wt. %, a pure carbon allotrope consisting of graphite of 30 nm or less average phase size; and
a ceramic phase having an average grain size of 30 nm or less and consisting of silicon carbide, the ceramic phase therein constituted by a ceramic matrix that excludes pure carbon allotropes.

4. A ceramic composite characterized in comprising:
a phase having as its principal component, at a content of 40 to 98 wt. %, a pure carbon allotrope consisting of graphite of 30 nm or less average phase size; and
a ceramic phase having an average grain size of 30 nm or less and consisting of silicon nitride, the ceramic phase therein constituted by a ceramic matrix that excludes pure carbon allotropes.

* * * * *

UNITED STATES PATENT AND TRADEMARK OFFICE
CERTIFICATE OF CORRECTION

PATENT NO. : 7,723,248 B2
APPLICATION NO. : 10/595577
DATED : May 25, 2010
INVENTOR(S) : Tomoyuki Ueno and Masashi Yoshimura It is certified that error appears in the above-identified patent and that said Letters Patent is hereby corrected as shown below:

Title page, left-hand column, at (87) PCT Pub. No.:
"WO2005/039733" should read --WO2005/040064--.

Title page, left-hand column, at (87) PCT Pub. Date:
"Jun. 5, 2005" should read --May 6, 2005--.

Signed and Sealed this

Tenth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,723,248 B2  Page 1 of 1
APPLICATION NO. : 10/595577
DATED : May 25, 2010
INVENTOR(S) : Tomoyuki Ueno and Masashi Yoshimura It is certified that error appears in the above-identified patent and that said Letters Patent is hereby corrected as shown below:

Col. 24; Claim 1, line 46, "carbon" should read --carbon allotropes--.

Col. 24; Claim 1, line 51 (last line), "150000" should read --1500° C--.

Col. 25; Claim 2, line 2 (second-to-last line), "150000" should read --1500° C--.

Signed and Sealed this

Fifth Day of October, 2010

David J. Kappos
*Director of the United States Patent and Trademark Office*